(12) United States Patent
Hanan

(10) Patent No.: US 12,304,688 B2
(45) Date of Patent: *May 20, 2025

(54) CONTAINER FINISH PORTION WITH POLISHED BUFFER ZONE

(71) Applicant: NIAGARA BOTTLING, LLC, Diamond Bar, CA (US)

(72) Inventor: Jay Clarke Hanan, Diamond Bar, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,090

(22) Filed: Nov. 6, 2023

(65) Prior Publication Data

US 2024/0067386 A1 Feb. 29, 2024

Related U.S. Application Data

(63) Continuation of application No. 17/062,427, filed on Oct. 2, 2020, now Pat. No. 11,807,413.

(60) Provisional application No. 62/910,302, filed on Oct. 3, 2019.

(51) Int. Cl.
 *B65D 1/02* (2006.01)
 *B29B 11/08* (2006.01)

(52) U.S. Cl.
 CPC ............ *B65D 1/0246* (2013.01); *B29B 11/08* (2013.01); *B29C 2949/0744* (2022.05); *B29C 2949/0822* (2022.05); *B29C 2949/0868* (2022.05); *B29C 2949/20* (2022.05)

(58) Field of Classification Search
 CPC ................ B65D 41/325; B65D 1/0246; B29C 2949/3009; B29C 2949/0822; B29C 2949/0777; B29C 2949/0769; B29C 49/06; B29C 2949/0868; B29C 2949/0776; B29C 2949/20; B29C 49/42802; B29C 49/071; B29C 2949/0715; B29C 2949/077;

(Continued)

(56) References Cited

U.S. PATENT DOCUMENTS

| 4,927,680 A | 5/1990 | Collette et al. |
| 5,011,648 A | 3/1991 | Garver et al. |
| 5,097,974 A | 3/1992 | Rozenberg |

(Continued)

FOREIGN PATENT DOCUMENTS

| EP | 1405710 B1 | 5/2008 |
| JP | S6251423 A | 3/1987 |

(Continued)

OTHER PUBLICATIONS

International Search Report with Written Opinion, PCT Application No. PCT/US2020/054179 dated Jan. 1, 2021 (8 Pages).

*Primary Examiner* — Monica A Huson
(74) *Attorney, Agent, or Firm* — Michael Best & Friedrich LLP

(57) ABSTRACT

A finish portion of a preform for rotatably engaging with a closure to seal contents within an interior of a container includes a body that begins at an opening to the interior, a sealing surface adjacent to the opening and including a first polished buffer zone configured to cooperate with a plug seal, and a transition surface extending from the sealing surface to a narrower handling surface. The first buffer zone is polished by way of a machine polishing technique.

20 Claims, 3 Drawing Sheets

(58) Field of Classification Search
CPC .... B29C 2949/0773; B29C 2949/0744; B29B 11/08; B29B 11/14; B29K 2995/0073
See application file for complete search history.

(56) References Cited

U.S. PATENT DOCUMENTS

| | | |
|---|---|---|
| 5,213,225 A | 5/1993 | King et al. |
| 5,756,172 A | 5/1998 | Semersky |
| 5,804,016 A | 9/1998 | Schmidt et al. |
| 5,888,598 A | 3/1999 | Brewster et al. |
| 6,260,723 B1 | 7/2001 | Bergholtz |
| 7,637,384 B2 | 12/2009 | Price et al. |
| 8,308,002 B2 | 11/2012 | Penny |
| 8,544,663 B2 | 10/2013 | Barel et al. |
| 8,815,356 B2 | 8/2014 | Huettner |
| 8,827,688 B2 | 9/2014 | Maki et al. |
| 9,033,168 B2 | 5/2015 | Darr et al. |
| 9,233,771 B2 | 1/2016 | Siegl |
| 9,994,350 B2 | 6/2018 | Labadie et al. |
| 11,738,902 B2 * | 8/2023 | Hanan .................. B29C 49/071 428/36.92 |
| 11,807,413 B2 * | 11/2023 | Hanan .................. B65D 1/0246 |
| 2002/0037338 A1 | 3/2002 | Lisch et al. |
| 2008/0050546 A1 | 2/2008 | Kitano et al. |
| 2008/0053949 A1 | 3/2008 | Farrar et al. |
| 2008/0116162 A1 | 5/2008 | Penny |
| 2008/0257855 A1 | 10/2008 | Patel |
| 2010/0178148 A1 | 7/2010 | Forsthoevel et al. |
| 2010/0252583 A1 | 10/2010 | Maas et al. |
| 2010/0314348 A1 | 12/2010 | Zoppas et al. |
| 2012/0091134 A1 | 4/2012 | Sadiq et al. |
| 2012/0263902 A1 | 10/2012 | Hanan |
| 2014/0076838 A1 | 3/2014 | Siegi |
| 2015/0027974 A1 | 1/2015 | Niec |
| 2015/0191269 A1 | 7/2015 | Siegl |

FOREIGN PATENT DOCUMENTS

| | | |
|---|---|---|
| WO | 2015032897 A1 | 3/2015 |
| WO | 2017136584 A1 | 8/2017 |

* cited by examiner

CONTAINER FINISH PORTION WITH POLISHED BUFFER ZONE

PRIORITY

This application is a continuation of U.S. patent application Ser. No. 17/062,427 filed Oct. 2, 2020, which claims the benefit of and priority to U.S. Provisional Application, entitled "Container Finish Portion With Polished Buffer Zone," filed on Oct. 3, 2019 and having application Ser. No. 62/910,302, the entirety of said application being incorporated herein by reference.

FIELD

Embodiments of the present disclosure generally relate to the field of plastic bottles and preforms. More specifically, embodiments of the disclosure relate to a preform that includes a mirror-polished sealing surface and is configured for being blow-molded to form a container.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin walled, and have the ability to maintain their shape by withstanding the force exerted on the walls of the container by their contents. PET resins are also reasonably priced and easy to process. PET bottles are generally made by a process that includes the blow-molding of plastic preforms which have been made by injection molding of the PET resin.

A plastic container for storing liquid contents typically includes a base that extends up to a grip portion suitable for affixing a label, as well as providing a location for grasping the container. The grip portion generally transitions into a shoulder, which connects to a bell. The bell has a diameter that generally decreases as the bell extends upward from the shoulder to a neck and a finish. The finish is adapted to receive a closure, such as a bottle cap, to seal the contents within the interior of the plastic container.

In many instances, the closure includes a tamper evidence band that is disposed around the perimeter of the finish. The tamper evidence band generally remains positioned on the finish when an end-user loosens the closure to access the contents within the container. As such, the tamper evidence band and the finish cooperate to indicate to the end-user whether or not the closure has been previously loosened after being installed by the manufacturer.

Advantages of plastic containers include lighter weight and decreased breakage as compared to glass, and lower costs overall when taking both production and transportation into account. As such, there is a continuous interest in creating the lightest possible plastic container so as to maximize cost savings in both transportation and manufacturing by making and using containers that contain less plastic.

One difficulty that may be encountered when working with relatively light plastic containers that are filled with liquid contents is leaking of the liquid contents. In an assembly-line environment, a multiplicity of containers are filled with liquid contents and sealed by closures as the containers are conveyed along the assembly-line. Each closure must be optimally threaded and tightened onto a finish portion of the container such that a plug seal of the closure extends into the finish portion and enters into a pressed relationship with a sealing surface whereby contents may be sealed in the interior of the container. The sealing surface generally must be very smooth to prevent the liquid contents from leaking out of the container. As will be appreciated, leaking may occur if there are any blemishes, such as scratches, gouges, or abrasions, on the sealing surface.

The problem of leaking contents is compounded in instances wherein an insert gas, such as nitrogen gas, is used to displace ordinary air within the containers. Scratches having a depth of 1.0 micrometer ($\mu$m) disposed in the sealing surface have been observed to allow nitrogen gas to leak out of the container. Embodiments disclosed herein provide container preforms that include a polished buffer zone comprising the sealing surface and configured to cooperate with the plug seal to prevent venting of inert gas and leaking of liquid contents from containers formed from the preforms.

SUMMARY

A preform is provided for blow-molding to form a container. The preform includes a finish portion for rotatably engaging a closure to seal contents within an interior of the container. The finish portion comprises a cylindrical body that begins at an opening to the interior and extends to and includes a tamper evidence ledge. A bevel at a beginning of the opening receives a plug seal of the closure, A sealing surface adjacent to the bevel is disposed along an interior of the finish portion and includes a polished buffer zone to cooperate with the plug seal to seal the container. A transition surface extends from the sealing surface to a handling surface that receives equipment to form the preform into the container. In some embodiments, the transition surface includes a polished buffer zone to cooperate with an end of the plug seal to seal the contents in the container.

In an exemplary embodiment, a finish portion of a preform for rotatably engaging with a closure to seal contents within an interior of a container formed from the preform comprises: a cylindrical body that begins at an opening to the interior and extends to and includes a tamper evidence ledge; a bevel disposed at a beginning of the opening and configured to receive a plug seal of the closure; a sealing surface adjacent to the bevel and including a first polished buffer zone configured to cooperate with the plug seal to seal the contents with the container; and a transition surface extending from the sealing surface to a handling surface configured to receive equipment to form the preform into the container.

In another exemplary embodiment, the first buffer zone is polished by way of any of hand polishing techniques, coating with known chemicals, plasma treatments, electrocoating treatments, or machine polishing techniques. In another exemplary embodiment, the first buffer zone exhibits a Roughness Average ranging between substantially 0.1 $\mu$m and substantially 0.3 $\mu$m. In another exemplary embodiment, the Roughness Average of the first buffer zone ranges between 0.15 $\mu$m and 0.25 $\mu$m. In another exemplary embodiment, the first buffer zone comprises a Roughness Average of about 0.2 $\mu$m.

In another exemplary embodiment, the first buffer zone is disposed at a location of the sealing surface that is contacted by the plug seal of the closure. In another exemplary embodiment, the first buffer zone includes a width that is configured to accommodate variations in the location that may be contacted by the plug seal. In another exemplary embodiment, the width ranges between substantially 50 $\mu$m and 150 μm. In another exemplary embodiment, the width ranges between substantially 75 μm and 125 μm. In another exemplary embodiment, the width is roughly 100 μm.

In another exemplary embodiment, the sealing surface includes a run-in surface comprising a smooth transition that extends from the bevel to the first buffer zone. In another exemplary embodiment, the run-in surface is configured to assist the plug seal traveling onto the first buffer zone during installation of the closure onto the finish portion. In another exemplary embodiment, the run-in surface is polished similarly to the first buffer zone.

In another exemplary embodiment, the transition surface includes a second polished buffer zone that extends from the first buffer zone and terminates at the handling surface. In another exemplary embodiment, the second buffer zone is polished substantially similarly to the first buffer zone. In another exemplary embodiment, the first and second buffer zones may be formed within the finish portion either before or after the preform is blow-molded to form the container. In another exemplary embodiment, the first and second buffer zones are formed after blow-molding the container so as to reduce the depth of scratches and other blemishes on the surfaces.

In another exemplary embodiment, the first and second buffer zones are polished to a surface smoothness wherein blemishes in the surface have a depth reduced to less than roughly 5.0 μM. In another exemplary embodiment, the first and second buffer zones are polished to a surface smoothness wherein blemishes in the surface have a depth reduced to less than roughly 1.0 μm. In another exemplary embodiment, the first and second buffer zones are polished to a surface smoothness wherein blemishes have a depth ranging between substantially 10 μm and 40 μm in depth. In another exemplary embodiment, the first and second buffer zones are polished to a surface smoothness wherein blemishes range between substantially 10 μm and 12 μm in depth.

BRIEF DESCRIPTION OF THE DRAWINGS

The drawings refer to embodiments of the present disclosure in which.

Figure 1:
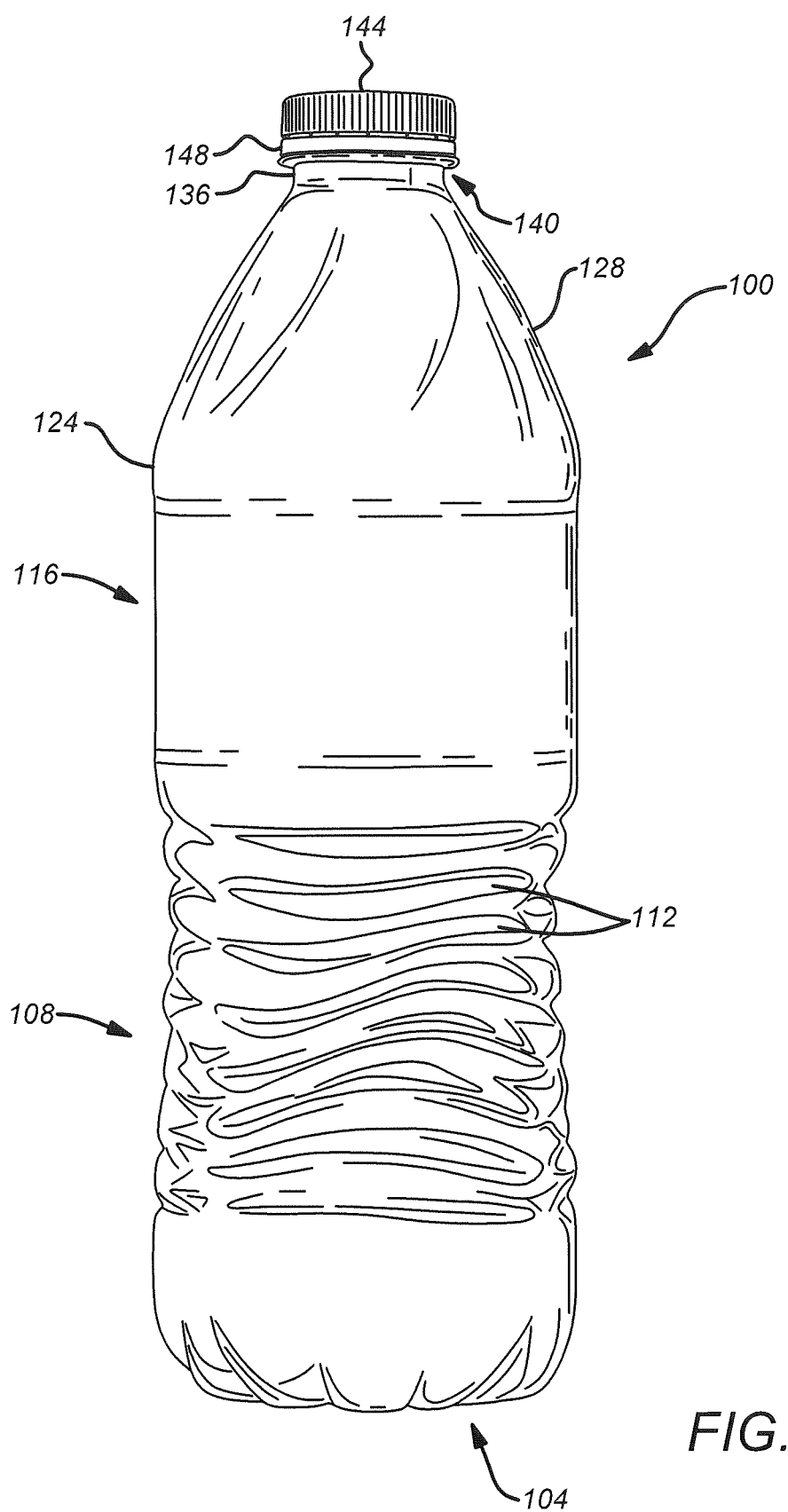
FIG. 1 illustrates a side view of an exemplary container suitable for storing a beverage.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first bottle," may be made. However, the specific numeric reference should not be interpreted as a literal sequential order but rather interpreted that the "first bottle" is different than a "second bottle." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, there is a continuous interest in creating the lightest possible plastic container so as to maximize cost savings in both transportation and manufacturing by making and using containers that contain less plastic. One difficulty encountered when working with relatively light plastic containers is leaking of liquid contents and/or venting of inert gas from within the containers. In an assembly-line environment, a multiplicity of containers are filled with liquid contents and sealed by closures as the containers are conveyed along the assembly-line. A plug seal of a closure must extend into a finish portion of each container and press against a sealing surface to seal contents in the interior of the container. Embodiments disclosed herein provide container preforms that include a polished buffer zone comprising the sealing surface and configured to cooperate with the plug seal to prevent venting of inert gas and leaking of liquid contents from containers formed from the preforms.

FIG. 1 illustrates a side view of an exemplary container 100 typically used for storing liquid contents, such as water and juice. The container 100 comprises a base 104 that extends up to a grip portion 108. In some embodiments, the base 104 may be of the petaloid variety, although other configurations of the base may be incorporated into the container 100, without limitation. The grip portion 108 comprises a plurality of grip portion ribs 112 (i.e., sidewall ribs). As illustrated in FIG. 1, the plurality of grip portion ribs 112 generally vary in depth, and swirl or angulate around the grip portion 108. A label portion 116 is connected to the grip portion 108 and comprises one or more label panel ribs (not shown). The label panel portion 116 transitions into a shoulder 124, which connects to a bell 128. In the embodiment illustrated in FIG. 1, the bell 128 comprises a plurality of design features 132. In other embodiments, however, the bell 128 may include various other design features, or may be smooth and generally unornamented. The bell 128 connects to a neck 136, which connects to a finish 140. As shown in FIG. 1, the bell 128 comprises a diameter that generally decreases as the bell 128 extends upward from the shoulder 124 to the neck 136 and the finish 140. The finish 140 is adapted to receive a closure, such as by way of non-limiting example, a container cap or closure 144, so as to seal contents within the container 100. The finish 140 generally defines an opening that leads to an interior of the container 100 for containing a beverage. The finish 140 may be of the Carbonated Soft Drink (CSD) variety, or may be configured to receive closures suitable for sealing noncarbonated contents within the interior of the container 100. Further, the finish 140 and the container 100 may be suitable for being hot-filled or aseptically filled, without limitation.

Figure 3:
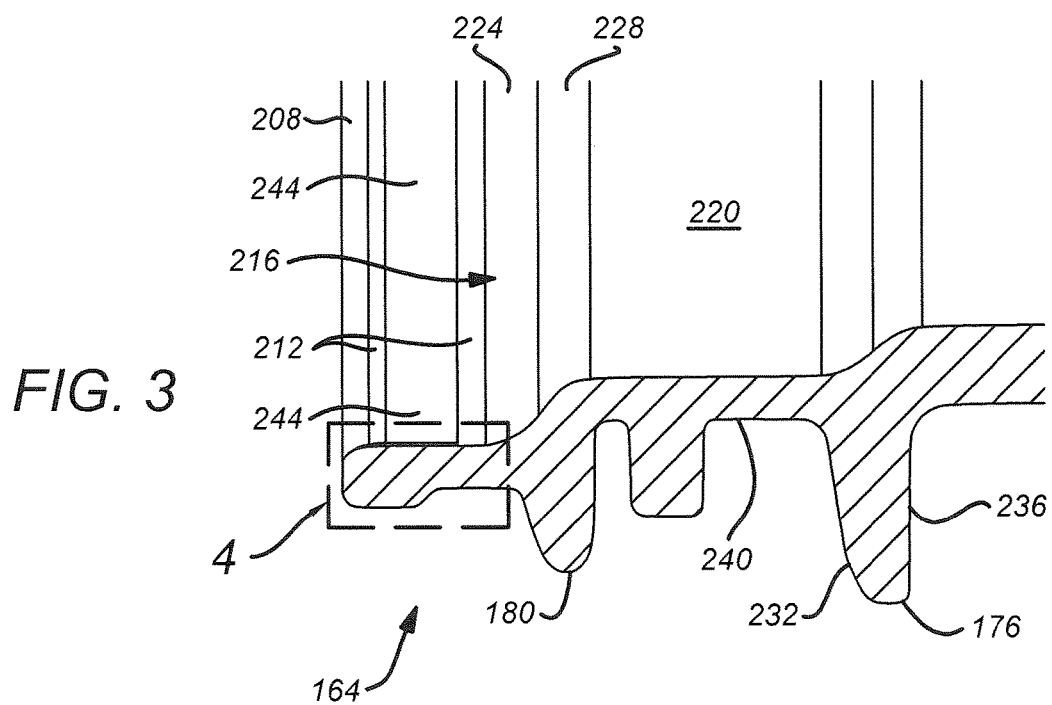
FIG. 3 illustrates a cross-sectional view of a finish comprising the preform illustrated in FIG. 2, taken along a line 3-3, according to the present disclosure.

As shown in FIG. 1, a tamper evidence closure 144 may be threadably engaged with the finish 140 of FIG. 3. The closure 144 generally includes interior threads that are configured to engage with threads disposed on the finish 140, as described herein. During tightening of the closure 144 onto the finish 140, a plug seal of the closure 144 extends into the opening of the container 100 and enters into a pressed relationship with the finish 140 whereby contents may be sealed in the interior of the container 100.

As further shown in FIG. 1, the closure 144 includes a tamper evidence band 148 to provide an indication of whether or not the closure 144 has been loosened after being installed by a manufacturer. In some embodiments, the tamper evidence band 148 may be attached to the closure 144 by a multiplicity of thin connections. The tamper evidence band 148 may include a cam that is configured to fixedly engage with a tamper evidence ledge disposed on the finished 140 during loosening of the closure 144. Once the closure 144 is installed onto the finish 140 by a manufacturer and later an end-user loosens the closure 144, the cam engages the tamper evidence ledge, breaking the thin connections between tamper evidence band 148 and the closure 144. The tamper evidence band 148 remains positioned on the tamper evidence ledge after the closure 144 is removed from the container 100. As such, the tamper evidence band 148 cooperates with the tamper evidence ledge to indicate to the end-user whether or not the closure 144 has been previously loosened after being installed by the manufacturer.

Figure 2:
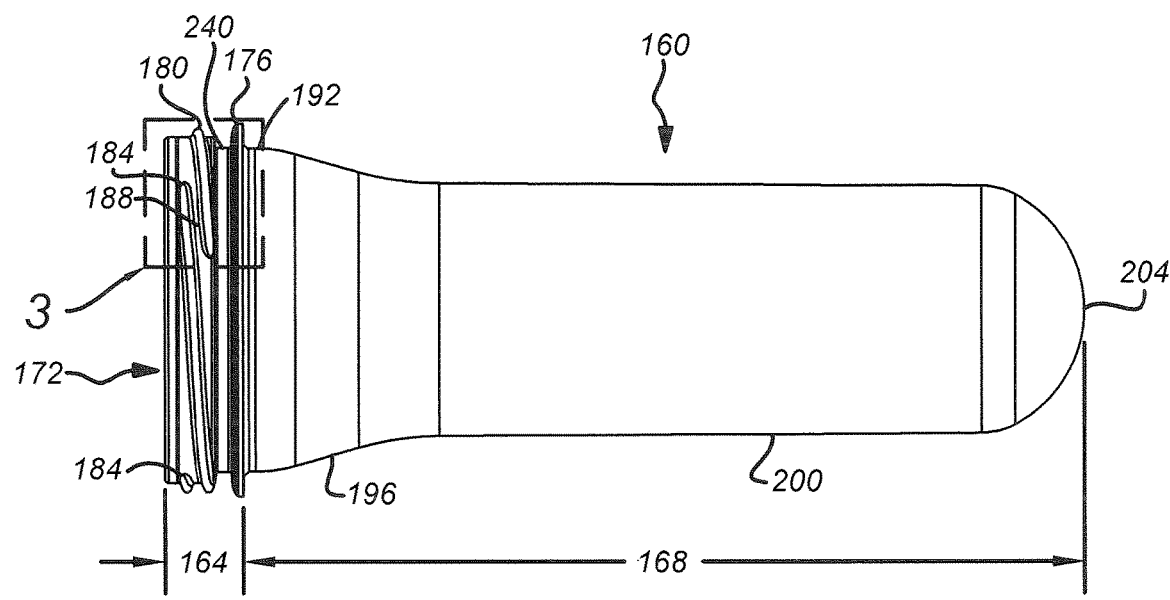
FIG. 2 a side plan view of an exemplary embodiment of a preform suitable for being blow-molded to form a container in accordance with the present disclosure.

FIG. 2 illustrates an exemplary embodiment of a preform 160 suitable for being blow-molded to form a plastic bottle, such as the container 100, according to the present disclosure. The preform 160 preferably is made of material approved for contact with food and beverages such as virgin PET or recycled PET and can be of any of a wide variety of shapes and sizes. The preform 160 shown in FIG. 2 is of the type which will form a 12-16 oz. beverage bottle, but as will be understood by those skilled in the art, other preform configurations may be used depending upon the desired configuration, characteristics and use of the final article. The preform 160 may be made by injection molding methods, without limitation.

The preform 160 includes a finish portion 164 and a body portion 168, formed monolithically (i.e., as a single, or unitary, structure). Advantageously, the monolithic arrangement of the preform 160, when blow-molded into a bottle, provides greater dimensional stability and improved physical properties in comparison to a preform constructed of separate neck and body portions that are bonded together.)

The finish portion 164 begins at an opening 172 to an interior of the preform 160 and extends to and includes a tamper evidence ledge 176. The finish portion 164 is further characterized by the presence of one or more threads 180 configured to provide a means to fasten a closure, such as a cap, to the bottle produced from the preform 160. As such, the threads 180 are configured to rotatably engage with similar threads disposed within the cap to provide a way to seal contents within the bottle. In the embodiment illustrated in FIG. 2, each of the threads 180 generally extends along a section of the circumference of the finish portion 164 and approaches the tamper evidence ledge 176. Thus, when the threads of a cap are engaged with the threads 180, and the cap is rotated in a clockwise direction, the cap advances toward the tamper evidence ledge 176.

With continuing reference to FIG. 2, each of the one or more threads 180 begins at a thread start 184 and extends along an angular section of the finish portion 164. The thread start 184 is configured to guide the thread 180 into a space, or valley, between adjacent threads of the closure 144 so as to threadably engage the closure 144 with the finish portion 164. Further, the threads 180 generally are disposed adjacently to one another, separated by a valley 188, and are spaced uniformly around the circumference of the finish portion 164. In some embodiments, wherein three threads 180 are disposed around the finish portion 164, the thread starts 184 of adjacent threads 180 are spaced at substantially 120-degree intervals around the perimeter of the finish portion 164. As will be appreciated, however, more or less than three threads 180 may be incorporated into the finish portion 164 without deviating beyond the scope of the present disclosure.

The body portion 168 includes a neck portion 192 that extends to a tapered portion 196 of the body portion 168. The tapered portion 196 comprises a smooth transition from a diameter of the neck portion 192 to a relatively smaller diameter of a cylindrical portion 200 of the preform 160. The cylindrical portion 200 is a generally elongate member that culminates in an end cap 204. In some embodiments the body portion 168 may be generally cylindrical, and the end cap 204 may be conical or frustoconical and may also be hemispherical, and the very terminus of the end cap 204 may be flattened or rounded.

In some embodiments, a wall thickness of the cylindrical portion 200 may be substantially uniform throughout the cylindrical portion 200 and the end cap 204. A wall thickness of the tapered portion 196, however, generally decreases from the wall thickness of the cylindrical portion 200 to a relatively thinner wall thickness of the neck portion 192. As will be appreciated, the wall thickness of the cylindrical portion 200 is relatively greater than the wall thickness of the neck portion 192 so as to provide a wall thickness at the desired dimensions of a finished product after the preform 160 is blow-molded into the shape and size of a bottle. As such, the wall thickness throughout most of the body portion 168 will depend upon the overall size of the preform 160 and the wall thickness and overall size of the resulting container.

FIG. 3 illustrates a cross-sectional view of the finish portion 164 of the preform 160, illustrated in FIG. 2, taken along a line 3-3. As will be appreciated, the finish 164 comprises a cylindrical body that begins at the opening 172 to the interior of the container 100 and extends to and includes the tamper evidence ledge 176. As described hereinabove with respect to FIG. 2, the finish portion 164 includes one or more threads 180 extending along sections of the circumference of the finish portion 164 and approaching the tamper evidence ledge 176. The threads 180 generally extend outward from the finish portion 164 such that a valley 188 is disposed between adjacent threads. The cross-sectional profile of the threads 180 is configured such that the threads advantageously engage with similar threads disposed within the closure 144 for sealing contents within the container 100 formed by blow-molding the preform 160. As will be recognized by those skilled in the art, the valley 188 is configured to allow passage of a thread disposed in the closure 144 to pass between adjacent threads 180 during tightening of the closure 144 onto the finish portion 164.

With continuing reference to FIG. 3, the finish portion 164 includes a bevel 208 disposed at the beginning of the opening 172. The bevel 208 is configured to enter into sliding contact with a plug seal 250 (see FIG. 5) of the closure 144 so as to prevent contents from leaking out of the container 100 formed from the preform 160. In some embodiments, the bevel 208 operates to guide the plug seal onto a sealing surface 212 disposed on an interior of the finish portion 164. In general, the bevel 208 and the sealing surface 212 comprise portions of the interior of the finish portion 164 that extend circumferentially around the opening 172.

As will be appreciated, the sealing surface 212 must comprise a sufficiently smooth surface capable of cooperating with the plug seal to retain contents within the container 100. To this end, the sealing surface 212 may include a highly polished buffer zone 244 that is substantially free of surface defects and thus conditioned to form a tight seal with the plug seal of the closure 144. It is contemplated that the buffer zone 244 may be polished by way of a variety of techniques, such as, by way of non-limiting example, hand polishing techniques, coating with known chemicals, plasma treatments, electrocoating treatments, as well as machine polishing techniques, and the like. In some embodiments, the buffer zone 244 may be polished such that the buffer zone 244 exhibits a Roughness Average (R a) ranging between substantially 0.1 µm and substantially 0.3 µm, without limitation. In some embodiments, the R a of the buffer zone 244 may range between 0.15 µm and 0.25 µm, without limitation. In one embodiment, the buffer zone 244 comprises an Ra of about 0.2 µm.

Figure 4:
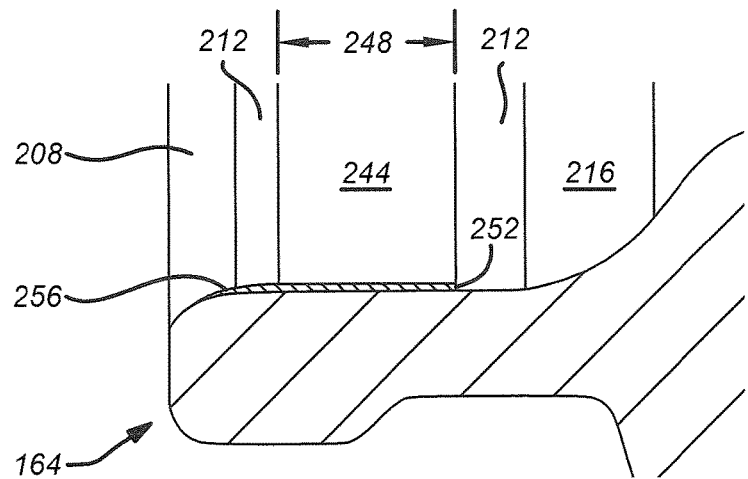
FIG. 4 illustrates a close-up view of an exemplary embodiment of a polished buffer zone disposed within the finish portion of FIG. 3.
Figure 5:
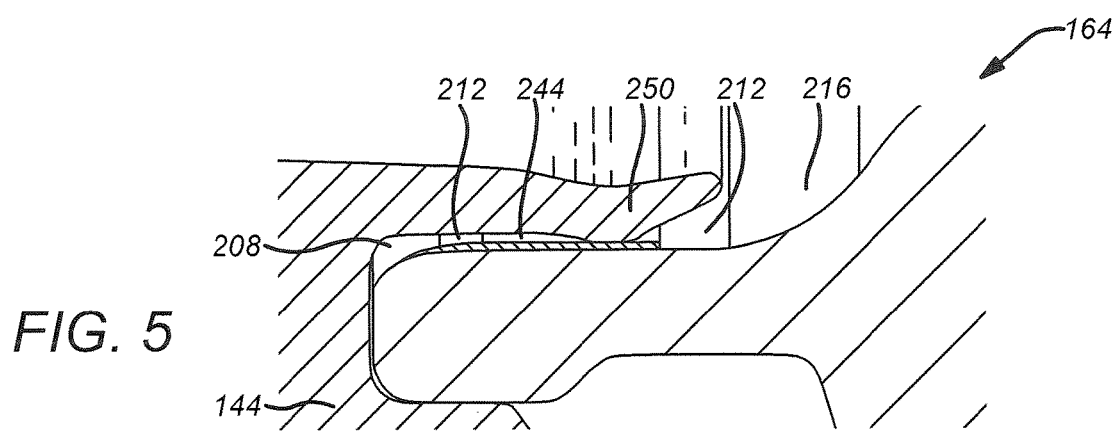
FIG. 5 illustrates an exemplary-use environment wherein a plug seal comprising a closure is engaged with the buffer zone of FIG. 4.

As best shown in FIGS. 4-5, the buffer zone 244 is disposed within a location of the sealing surface 212 that is to be contacted by the plug seal 250 of the closure 144. The buffer zone 244 includes a width 248 that is configured to accommodate variations in the location within the finish portion 164 that may be contacted by the plug seal 250. As such, the buffer zone 244 comprises a highly polished band that extends around the inner circumference of the finish portion 164. It is contemplated that, in some embodiments, the width 248 ranges between substantially 50 µm and 150 µm, without limitation. In some embodiments, however, the width 248 may range between substantially 75 µm and 125 µm, without limitation. Further, in one embodiment, the width 248 may be roughly 100 µm. It should be understood, therefore, that the width 248 generally depends on the specific characteristics of the closure 144, such as the plug seal 250, that is to be coupled with the finish portion 164.

Moreover, as shown in FIG. 4, the sealing surface 212 may include a run-in surface 256 that extends from the bevel 208 to the buffer zone 244. The run-in surface 256 generally comprises a smooth transition between the bevel 208 and the buffer zone 244. It is contemplated that the run-in surface 256 may assist the plug seal 250 traveling onto the buffer zone 244 during installation of the closure 144 onto the finish portion 164. In some embodiments, the run-in surface 256 may be polished similarly to the buffer zone 244. Alternatively, however, the run-in surface 256 may be omitted from the finish portion 164, without limitation.

Referring again to FIG. 3, the sealing surface 212 generally extends away from the bevel 208, deeper into the opening 172 to a transition surface 216. The transition surface 216 comprises a region within the interior of the finish portion 164 wherein the interior diameter of the opening 172 narrows from the diameter of the sealing surface 212 to a smaller diameter of a handing surface 220. In the embodiment illustrated in FIG. 3, the transition surface 216 comprises a reverse curve surface that includes a concave portion 224 that extends from the sealing surface 212 and joins with a convex portion 228 that extends to the handing surface 220. The handling surface 220 includes a diameter of the opening 172 that is configured to receive various forms of equipment used to configure the preform 160 into the container 100.

It is contemplated that the transition surface 216 may be capable of cooperating with the plug seal 250 of the closure 144 to form a tight seal between the closure 144 and the container 100. In some embodiments, the concave portion 224 may be configured to forcibly receive an end of the plug seal 250 so as to form a tight seal therebetween. Further, in some embodiments, the convex portion 228 may be configured to forcibly receive the end of the plug seal 250.

Figure 6:
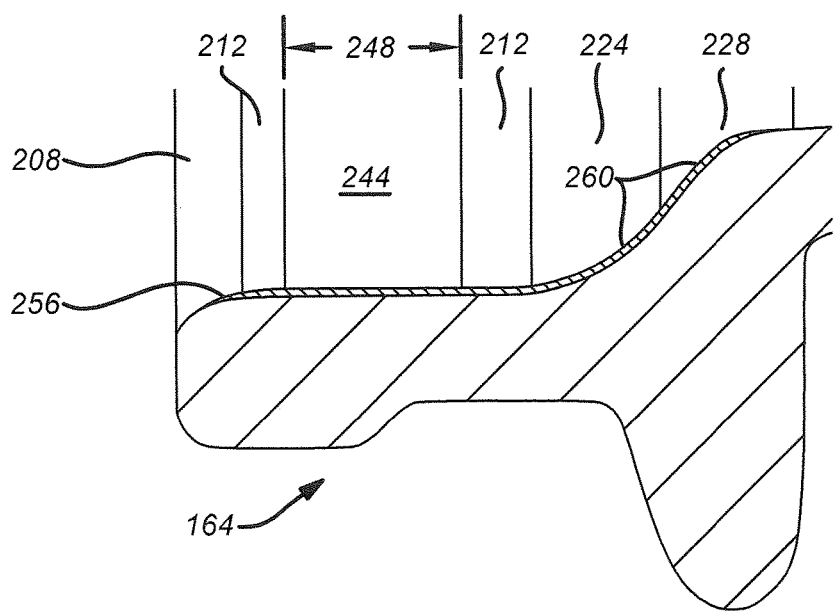
FIG. 6 illustrates an exemplary embodiment of a finish portion that includes a polished buffer zone extending to a transition surface.

In some embodiments, the transition surface 216 may include a smooth surface that is polished similarly to the sealing surface 212. It is envisioned that, in some embodiments, the transition surface 216 may be polished similarly to the buffer zone 244 as described hereinabove. For example, as shown in FIG. 6, the transition surface 216 may include a polished buffer zone 260 that extends from the buffer zone 244, traverses the concave and convex portions 224, 228, and terminates at the handling surface 220. It is contemplated that the buffer zone 260 may be polished as disclosed herein with respect to the buffer zone 244. In some embodiments, therefore, substantially an entirety of the interior of the finish portion 164, extending between the bevel 208 and the handling surface 220, may comprise a highly polished buffer zone, without limitation.

The buffer zones 244, 260 may be formed within the finish portion 164 either before or after the preform 160 is blow-molded to form the container 100, without limitation. It is contemplated, however, that forming the buffer zones 244, 260 after blow-molding the container 100 may be particularly advantageous for mitigating blemishes, such as scratches, that may be imparted to the finish portion 164 by blow-molding equipment. Scratches having a depth as shallow as 1.0 µm in the sealing surface 212 have been observed to allow nitrogen gas to leak out of the container 100. As such, forming the buffer zones 244, 260 after blow-molding the container 100 is capable of reducing the depth of scratches and other blemishes on the surfaces 212, 216.

Moreover, the degree to which the buffer zones 244, 260 are polished may vary depending on the type of contents to be sealed into the container 100. For example, in the case of nitrogen filled bottles, the buffer zones 244, 260 may be polished to a surface smoothness wherein blemishes in the surface have a depth reduced to less than roughly 1.0 µm. In some embodiments, however, the buffer zones 244, 260 may be polished to a surface smoothness wherein blemishes in the surface have a depth reduced to less than roughly 5.0 µm. In some embodiments, the buffer zones 244, 260 may be polished to a surface smoothness wherein blemishes range between substantially 10 µm and 12 µm in depth. Further, in some embodiments, the buffer zones 244, 260 may be polished to a surface smoothness wherein blemishes have a depth ranging between substantially 10 µm and 40 µm in depth. It should be understood, therefore, that the buffer zones 244, 260 may be polished to a degree of surface smoothness that depends on the type of contents to be sealed into the container 100, such as carbonated or noncarbonated contents, as well as the manner by which the container 100 is filled, such as, by way of non-limiting example, hot-filling or aseptic filling of the container 100, without limitation.

As best shown in FIG. 3, the interior of the finish portion 164 generally narrows from the diameter of the sealing surface 212 to a smaller diameter of a handing surface 220. It is contemplated, however, that either or both of the buffer zones 244, 260 may be implemented regardless of the narrowing interior diameter of the finish portion 164. For example, in some embodiments, either or both of the buffer zones 244, 260 may be disposed within a finish portion having an interior diameter that narrows from the sealing surface 212 directly to an interior surface of the body portion 168 in absence of the transitional surface 216. As such, it should be understood that the buffer zones 244, 260 disclosed herein are not limited to being applied to the specific finish portion 164 shown herein, but rather the buffer zones 244, 260 may be implemented in a wide variety of different finish portions and preforms, without limitation, and without deviating beyond the spirit and scope of the present disclosure.

With continuing reference to FIG. 3, the tamper evidence ledge 176 comprises a rounded upper portion 232 and a substantially flat lower portion 236. As will be appreciated, the rounded upper portion 232 facilitates passing the tamper evidence band 148 of the closure 144 over the tamper evidence ledge 176 during assembly of the closure 144 onto the container 100. The flat lower portion 236 is configured to retain the tamper evidence band 148 positioned below the tamper evidence ledge 176 during loosening of the closure 144. For example, when the closure 144 is initially installed onto the container 100 by a manufacturer, the tamper evidence band 148 easily passes over the tamper evidence ledge 176 due to the rounded upper portion 232. When an end-user later loosens the closure 144, the flat lower portion 236 retains the tamper evidence band 148 below the tamper evidence ledge 176, causing the tamper evidence band 148 to break loose from the closure 144. Thus, the flat lower portion 236 of the tamper evidence ledge 176 and the tamper evidence band 148 of the closure 144 cooperate to indicate to the end-user that the closure 144 has not been previously loosened after being installed by the manufacturer. It should be understood, however, that the tamper evidence ledge 176 is not limited to being coupled with tamper evidence bands, as described above, but rather the tamper evidence ledge 176 may be configured to operate with any of various devices for indicating whether or not the container has been previously opened.

Disposed between the tamper evidence ledge 176 and the threads 180 is a handling valley 240 that extends circumferentially around the finish portion 164. The handling valley 240 comprises a portion of the finish portion 164 that has a wall thickness and a diameter that are substantially similar to the wall thickness and diameter of the neck portion 192, below the tamper evidence ledge 176. As such, the handling valley 240 and the neck portion 192 advantageously enable gripping fingers to engage with and support the container 100 during air-conveying the container 100 along a manufacturing assembly. For example, a first pair of gripping fingers can extend into the handling valley 240 to support the container 100 at a first station of a manufacturing line. Then, upon being conveyed to a second station, a second pair of gripping fingers can extend around the neck portion 192, below the tamper evidence ledge 176, while the first pair of gripping fingers are removed from the handling valley 240. Similarly, upon arriving at a third station, a third pair of gripping fingers can engage with the handling valley 240 while the second pair of gripping fingers are removed from the neck portion 192. Thus, the container 100 can be transported along the manufacturing line by alternatingly engaging gripping fingers with the handling valley 240 and the neck portion 192.

As will be appreciated, the handling valley 240 provides a separation between the tamper evidence ledge 176 and the threads 180 suitable for receiving the pair of gripping fingers, as described above. In general, the separation must be large enough to allow the gripping fingers to easily pass between the tamper evidence ledge 176 and the threads 180. As such, any of various separations, greater than the width of the gripping fingers, may be disposed between the tamper evidence ledge 176 and the threads 180, without limitation and without deviating beyond the scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A finish portion of a preform for rotatably engaging with a closure to seal contents within an interior of a container formed from the preform, the finish portion comprising:
    a body that begins at an opening to the interior;
    a sealing surface adjacent to the opening and including a first polished buffer zone configured to cooperate with a plug seal; and
    a transition surface extending from the sealing surface to a narrower handling surface,
    wherein the first buffer zone is polished by way of a machine polishing technique.

2. The finish portion of claim 1, wherein the first buffer zone exhibits a Roughness Average ranging between substantially 0.1 μm and substantially 0.3 μm.

3. The finish portion of claim 1, wherein the first buffer zone includes a width that ranges between 50 μm and 150 μm.

4. The finish portion of claim 1, wherein the transition surface includes a second polished buffer zone.

5. The finish portion of claim 1, wherein the transition surface comprises a reverse curve surface that includes a concave portion that extends from the sealing surface and joins with a convex portion that extends to the handing surface.

6. The finish portion of claim 5, wherein the transition surface includes a second polished buffer zone that extends from the first buffer zone and terminates at the handling surface.

7. The finish portion of claim 6, wherein the Roughness Average of the second polished buffer zone ranges between 0.15 μm and 0.25 μm.

8. The finish portion of claim 6, wherein the second polished buffer zone includes a width that ranges between 50 μm and 150 μm.

9. The finish portion of claim 4, wherein the first and second buffer zones are polished to a surface smoothness wherein blemishes in the surface have a depth reduced to less than roughly 1.0 μm.

10. The finish portion of claim 4, wherein the first and second buffer zones are polished to a surface smoothness wherein blemishes have a depth ranging between substantially 10 μm and 40 μm in depth.

11. A finish portion of a preform for rotatably engaging with a closure to seal contents within an interior of a container formed from the preform, the finish portion comprising:
- a body that begins at an opening to the interior;
- a sealing surface adjacent to the opening and including a first polished buffer zone configured to cooperate with a plug seal; and
- a transition surface extending from the sealing surface to a narrower handling surface,
- wherein the first buffer zone is polished by way of a hand polishing technique.

12. The finish portion of claim 11, wherein the first buffer zone exhibits a Roughness Average ranging between substantially 0.1 μm and substantially 0.3 μm.

13. The finish portion of claim 11, wherein the first buffer zone includes a width that ranges between 50 μm and 150 μm.

14. The finish portion of claim 11, wherein the transition surface includes a second polished buffer zone.

15. The finish portion of claim 11, wherein the transition surface comprises a reverse curve surface that includes a concave portion that extends from the sealing surface and joins with a convex portion that extends to the handing surface.

16. The finish portion of claim 15, wherein the transition surface includes a second polished buffer zone that extends from the first buffer zone and terminates at the handling surface.

17. The finish portion of claim 16, wherein the Roughness Average of the second polished buffer zone ranges between 0.15 μm and 0.25 μm.

18. The finish portion of claim 16, wherein the second polished buffer zone includes a width that ranges between 50 μm and 150 μm.

19. The finish portion of claim 14, wherein the first and second buffer zones are polished to a surface smoothness wherein blemishes in the surface have a depth reduced to less than roughly 1.0 μm.

20. The finish portion of claim 14, wherein the first and second buffer zones are polished to a surface smoothness wherein blemishes have a depth ranging between substantially 10 μm and 40 μm in depth.

* * * * *